(12) United States Patent
Pereira et al.

(10) Patent No.: US 6,747,270 B2
(45) Date of Patent: Jun. 8, 2004

(54) METHOD AND APPARATUSES FOR LOGGING HYDROCARBON RESERVOIRS (75) Inventors: Charles Alexander Pereira, Loughborough (GB); James Roger Samworth, Ashby de la Zouch (GB)

(73) Assignee: Reeves Wireline Technologies Limited, Loughborough (GB)

(*) Notice: Subject to any disclaimer, the term of this patent is extended or adjusted under 35 U.S.C. 154(b) by 140 days.

(21) Appl. No.: 09/950,951

(22) Filed: Sep. 12, 2001

(65) Prior Publication Data
US 2002/0046836 A1 Apr. 25, 2002

(30) Foreign Application Priority Data
Sep. 16, 2000 (GB) .............................................. 0022795

(51) Int. Cl.⁷ ................................................. G01V 5/10
(52) U.S. Cl. .................................... 250/269.4; 250/266
(58) Field of Search ................................ 250/266, 264, 250/269.7, 269.4

(56) References Cited

U.S. PATENT DOCUMENTS

| 3,483,376 A | 12/1969 | Locke et al. |
| 3,566,116 A | 2/1971 | Nelligan |
| 3,691,378 A | 9/1972 | Hopkinson et al. |
| RE28,477 E | 7/1975 | Nelligan |
| 4,055,763 A | 10/1977 | Antkiw |
| 4,095,102 A | 6/1978 | Tixier |
| 4,416,151 A | 11/1983 | Ullo |
| 4,604,522 A | * 8/1986 | Arnold ........................ 250/266 |
| 4,785,175 A | * 11/1988 | Wormald et al. ........... 250/266 |
| 4,952,801 A | 8/1990 | Gold |
| 5,105,080 A | * 4/1992 | Stoller et al. ................ 250/266 |
| 5,591,967 A | * 1/1997 | Moake ........................ 250/266 |
| 2002/0014583 A1 | * 2/2002 | Bothner ................... 250/269.7 |

FOREIGN PATENT DOCUMENTS

EP   0184898 B1   7/1990

OTHER PUBLICATIONS

UK Patent Office Search Report dated Feb. 27, 2001 (GB Application No. 0012795.9) one page.

* cited by examiner

Primary Examiner—Constantine Hannaher
(74) Attorney, Agent, or Firm—Paul & Paul

(57) ABSTRACT

A method, of logging a borehole, for use in a cased oil well for detecting the gas/oil or water/oil contact in a hydrocarbon reservoir, using a neutron capture technique to detect one or more properties of fluid includes comparing the count rates from two or more radiation detectors spaced at respective first and second distances from an isotopic source of continuous neutron radiation. The contact detection criteria are arranged to be substantially independent of borehole fluid characteristics.

Apparatus (10) for carrying out the method includes a logging tool (10) having an isotopic source (16) and two spaced detectors (17,18).

20 Claims, 5 Drawing Sheets

METHOD AND APPARATUSES FOR LOGGING HYDROCARBON RESERVOIRS

This invention relates to a method and apparatuses for logging hydrocarbon reservoirs. More particularly the invention concerns the logging of gas/oil and water/oil contacts in geological formations.

It is highly desirable to be able reliably to distinguish between oil and water in a geological formation penetrated by an oil well. The ability to do so enables one to determine whether a porous formation contains oil or water and the position of the oil/water interface during well production and whether the water driving fluid has broken through to the production well in a water flood secondary production operation. In open-hole, that is a well without a steel liner or casing, it is conventional to distinguish between oil and water by means of a resistivity tool which reads a low resistivity when the formation is saturated with saline water, a good conductor; and a high resistivity when the formation is saturated with oil, an insulator.

It is also conventional to distinguish between oil and water in a cased well by taking advantage of the differences in the macroscopic neutron absorption cross section (Sigma) of oil and the normally saline formation water. Since the saline formation water contains chlorine which has a rather high neutron capture cross section and since oil does not, neutron tools have been developed which essentially measure the macroscopic neutron capture cross section.

For example, U.S. Pat. Nos. 3,566,116 (reissued Jul. 8, 1975 as U.S. Pat. No. 28,477); 3,691,378; and 4,055,763 illustrate variations of one such technique for determining Sigma in which a pulsed neutron source is utilized to irradiate the formation with a repetitive burst of fast neutrons in order to permit a time evaluation of the neutron population in the resultant neutron cloud. Typically, this evaluation is accomplished by detecting capture gamma rays which result when thermalized neutrons of the cloud are captured or absorbed by a nucleus of a constituent element in the formation. In such a time evaluation, advantage is taken of the fact that the neutron cloud density decays exponentially, with the characteristic decay time being a function of the macroscopic neutron absorption cross section of the formation. The macroscopic neutron absorption cross section is the sum of the neutron absorption of the elemental constituents of the formation and of its contained fluids.

While these neutron tools and techniques are quite effective in distinguishing between oil and water under normal circumstances, a number of limitations have been encountered. Once such limitation is the situation in which the non-oil fluid in the formation is fresh water rather than saline (or, more generally, chloride-containing) water. In this circumstance it is not possible using the above described pulsed neutron technique to distinguish between oil and water since the difference in neutron capture cross section between the two formation fluids (oil and fresh water) is not large enough to permit their differentiation.

An additional limitation with the pulsed neutron technique is encountered in wells that have fresh water in the well borehole, even though saline water is present in the formation. In such a circumstance, some neutrons from the neutron burst are thermalized and linger in the fresh water of the borehole, giving rise to an interfering "diffusion" background. This effect of course does not occur in those boreholes having saline water since the chlorine is a strong neutron absorber which rapidly absorbs the diffusing neutrons. The "diffusion" background is a particularly awkward problem in the pulsed neutron technique since the determination of the characteristic decay time following the neutron burst relies on the detection of neutron fluxes whose intensities decrease with time to relatively small values. As a result, the "diffusion" background becomes large relative to the neutron flux of interest so as to obscure the information bearing signal.

In view of the difficulties and limitations inherent in the pulsed neutron technique, other measurements and techniques that might be suitable for distinguishing between oil and water were sought. Another conventional neutron instrument used in logging oil wells is commonly referred to as the neutron-neutron tool since it contains a continuous neutron source for irradiating the formation and neutron detectors for detecting the spatial distribution of neutrons established by the source. It is conventional to utilize this tool to measure porosity of the formation under investigation. U.S. Pat. No. 3,483,376, describes in detail an illustrative embodiment of such a neutron-neutron tool.

Interestingly, in the past, very little has been understood about which parameters of a medium influence porosity response in an investigating instrument. This is indeed the case for neutron-neutron or neutron-gamma porosity tools. Such neutron tools utilize a source for emitting neutrons into the adjacent formations and subsequently or simultaneously detect the spatial distribution of the resultant neutron cloud through either the direct detection of neutrons or through the detection of gamma rays which are created when a neutron is absorbed in the nucleus of an atom of the formation.

Following emission from the source, the neutrons travel through the formation and lose energy by collision with the nuclei of the atoms of the formation. When the energy level of the neutrons is reduced or moderated sufficiently, they may be detected and counted by the investigating instrument. Generally, it is assumed that primarily the hydrogen index (i.e., the number of hydrogen atoms per unit volume of the formation fluid) is responsible for the spatial distribution of the cloud of neutrons. Since hydrogen is the only element whose nuclear mass resembles that of the neutron, hydrogen is the most effective element in reducing the energy level of the neutrons to a level at which they are eventually detected. In general, the formation pore spaces are filled either with water or with liquid hydrocarbons which both contain hydrogen. Thus, this type of neutron log is essentially a record of the hydrogen atom density of the rocks surrounding the borehole. Previously, the neutron log has been considered, therefore, to be a measure of the formation porosity. It is well recognized that gas, on the other hand, will alter this porosity determination since the gas is much less dense than its oil liquid counterpart.

U.S. Pat. No. 4,095,102 compares a value of porosity derived from an epithermal neutron-(gamma) tool with a value of porosity derived directly from a measurement of the thermal neutron absorption characteristic of the formation and the value of the water component of the formation. Where a difference is noted, hydrocarbon may be expected. In a manner similar to those techniques described earlier that utilize pulses of neutrons to determine a characteristic decay time dependent on macroscopic neutron capture cross section and hence a porosity, the disclosed technique requires saline water in the formation.

U.S. Pat. No. 4,416,151 also compares values of porosity derived from two different methods of porosity measurement, and associates differences with the presence of hydrocarbon.

During the life of an oil well the amount of water in the well itself tends to increase, and the above inventions can be sensitive to this, an effect which may mask the reliable detection of water/oil contacts in the reservoir, compromising their value.

According to a first aspect of the invention there is provided a method, of logging a borehole, for use in a cased oil well for detecting the gas/oil or water/oil contact in a hydrocarbon reservoir, using a neutron capture technique to detect one or more properties of fluid by comparing the count rates from two or more radiation detectors spaced at respective first and second distances from an isotopic source of continuous neutron radiation, the method including the steps of, at one or more locations along a said borehole, independently determining the properties of the borehole fluid and the formation fluid to define contact detection criteria that are substantially unaffected by the borehole fluid and formation fluid chloride contents.

Advantages of this method are:
1. It avoids the problem arising from the "diffusion" background radiation caused by the borehole fluid;
2. It is highly effective regardless of the salinity of the formation and borehole fluids;
3. It may be practised using a compact tool that if desired may be self-powered and need not be connected to surface location via a logging cable.

Preferably the detected fluid property includes the density of the fluid in the reservoir.

It is believed that the method of the invention may also be used to detect other properties of the fluids in the formation.

Preferred embodiments of the method of the invention include the steps of comparing the counts generated by the said detectors against a characteristic plot of count rates corresponding to known borehole and formation fluids, whereby to ascertain the characteristics of the formation fluid. The characteristic plot preferably includes a plurality of substantially constant gradient curves representing the relative proportions of water and oil or gas and oil in respectively the formation and borehole fluids; and the step of comparing the generated count rates against the plot includes the step of mapping a generated count point onto one of the constant gradient curves at a point on the characteristic plot that corresponds to a characteristic of the formation fluid.

The use of such a characteristic plot, and such a method of analysing the outputs of the radiation detectors, provide highly sensitive logging of the gas/oil or water/oil contact in a formation.

More specifically the constant gradient curve onto which the generated count point is mapped preferably represents the relative proportions of water and oil (or gas and oil) in the formation fluid. Such a constant gradient curve may be stored eg. as a look-up table in the memory of a digital computer programmed to execute the method of the invention.

More specifically still, the step of mapping the generated count plot includes migrating a plotted generated count value along a constant gradient interpolation line that is interpolated between and intersects the intersection of two divergent constant gradient curves of the characteristic plot.

This technique advantageously lends itself to execution by an iterative method, or by an analytical method, either of which may be carried out by a suitably programmed digital computer.

In particularly preferred embodiments of the method of the invention, the characteristic plot is a two dimensional plot of count rates generated by the respective detectors.

Conveniently the method includes the step of generating a signal indicative of the relevant proportions of water and oil or gas and oil in the formation fluid. Such a signal may be used e.g. to store data as a log of the formation; or to transmit data e.g. to a remote location for analysis.

Consequently one embodiment of the method includes use of a borehole logging tool, and includes the step of transmitting the said signal from the tool at a downhole location to a surface location or another location remote from the logging tool.

In an alternative embodiment of the method the transmitting step includes storing data representative of the signal in a data storage device operatively connected to or forming part of the well logging tool; retrieving the data storage device to a location remote from the downhole; and downloading the data from the data storage device e.g. for subsequent analysis and/or interpretation.

As an alternative to the aforesaid steps, the transmitting step may include transmitting a signal in real time from a downhole location to a location remote from the logging tool such as a surface location. Transmission of the signal may conveniently be achieved by one or more of electrical conduction via one or more wires; or generation of pressure pulses in borehole fluid.

Conveniently the logging is carried out using a compact diameter (i.e. less than 2¼ inches (57 mm) diameter) battery/memory tool (i.e. a tool having an on-board memory and power supply, that does not require power and data transmission cables to enable logging to take place). In particularly preferred embodiments of the invention the logging tool may if desired be the same (or of the same design) as the logging tool used to generate an openhole log of the borehole before deployment of a casing.

According to another aspect of the invention there is provided apparatus for detecting the gas/oil or water/oil contact in a hydrocarbon reservoir penetrated by a cased oil well, the apparatus comprising:
  (i) a logging tool having: a pressure case; a continuous source of fast neutrons; and two or more radiation detectors each spaced from the source by a different distance;
  (ii) a computer for coordinating a method as defined herein; and
  (iii) a transmitter for transmitting one or more signals characteristic of the gas/oil or water/oil contact in a formation.

This apparatus is advantageously suitable for carrying out the method of the invention defined herein.

In one embodiment of the invention the radiation detectors include two gamma detectors that are spaced from one another in the logging tool.

In another embodiment the radiation detectors include two neutron detectors that are spaced from another in the logging tool.

A further possibility is a logging tool that includes both neutron and gamma detectors.

The logging tool may be of the conventional type that includes a logging cable operatively connected thereto, for suspending, powering and permitting data transmission to and from the logging tool.

As an alternative the logging tool may include one or more power sources and data storage devices. The latter kind of logging tool may be configured as a so-called "battery memory tool", that does not necessarily require electrical connection to a surface location, being self-powered and capable of storing data until an opportunity for downloading the data arises following recovery of the logging tool to a surface (or other) location. Preferably such a tool is of so-called "compact" diameter (i.e. less than 2¼ inches (57 mm) diameter).

In particularly preferred embodiments of the invention, the computer that co-ordinates execution of the method is within the pressure casing of the logging tool.

In summary a method is described which utilizes a logging tool that examines the count rates acquired in a novel way to determine a change in formation fluids without the effects being masked by changes in the borehole fluid. Over a period of time, as an oil well produces oil, the contact between water and oil changes, as do the fractions of water and oil in the well bore itself. If well logs acquired over this period are examined, these two changes are the only significant changes that can have occurred, but it is difficult to distinguish them from one another. The method and apparatus of the invention allow assessment of the change in formation fluids to be made. It has been shown that oil and low salinity water affect the measured neutron flux at the detectors differently, allowing the method to be used.

The invention also resides in data obtained by practicing the method of the invention defined herein.

There now follows a description of preferred embodiments of the invention, by way of non-limiting example, with reference being made to the accompanying drawings in which.

Figure 1:
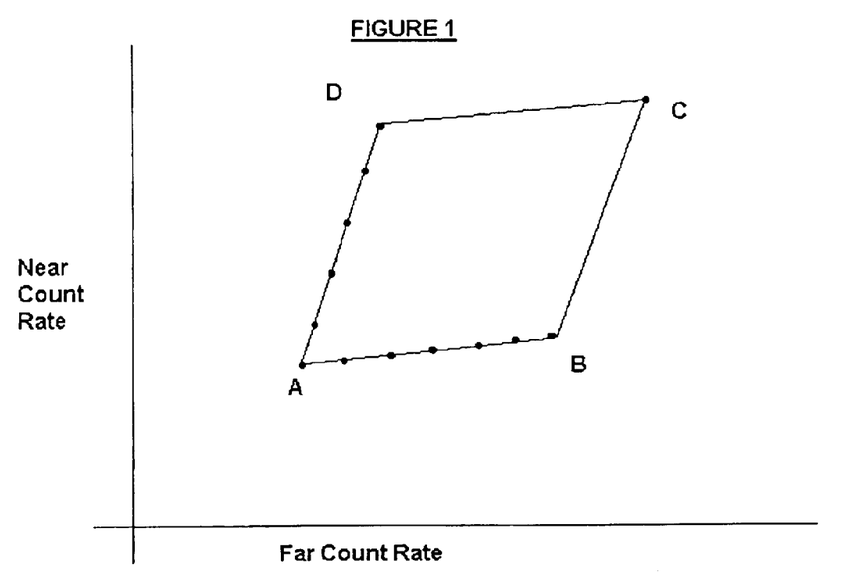
FIG. 1 is a characteristic plot indicative of characteristics of formation borehole fluids, referenced to the outputs of two respective radiation detectors in a logging tool adapted to carry out the method of the invention.
Figure 3:
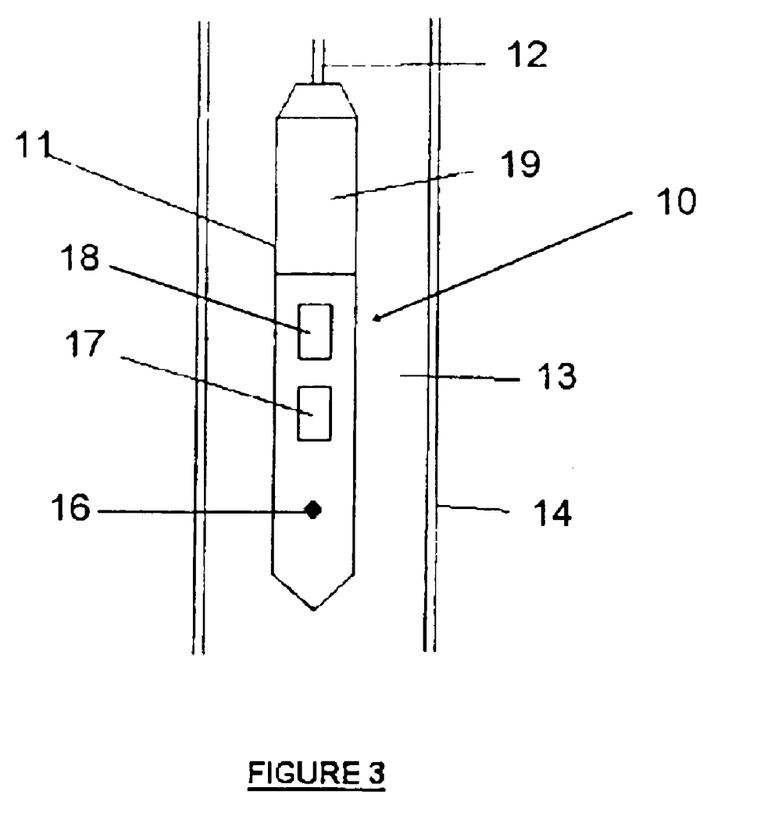
FIG. 3 is a schematic representation of a first embodiment of logging tool according to the invention and suitable for carrying out the method of the invention.
Figure 4:
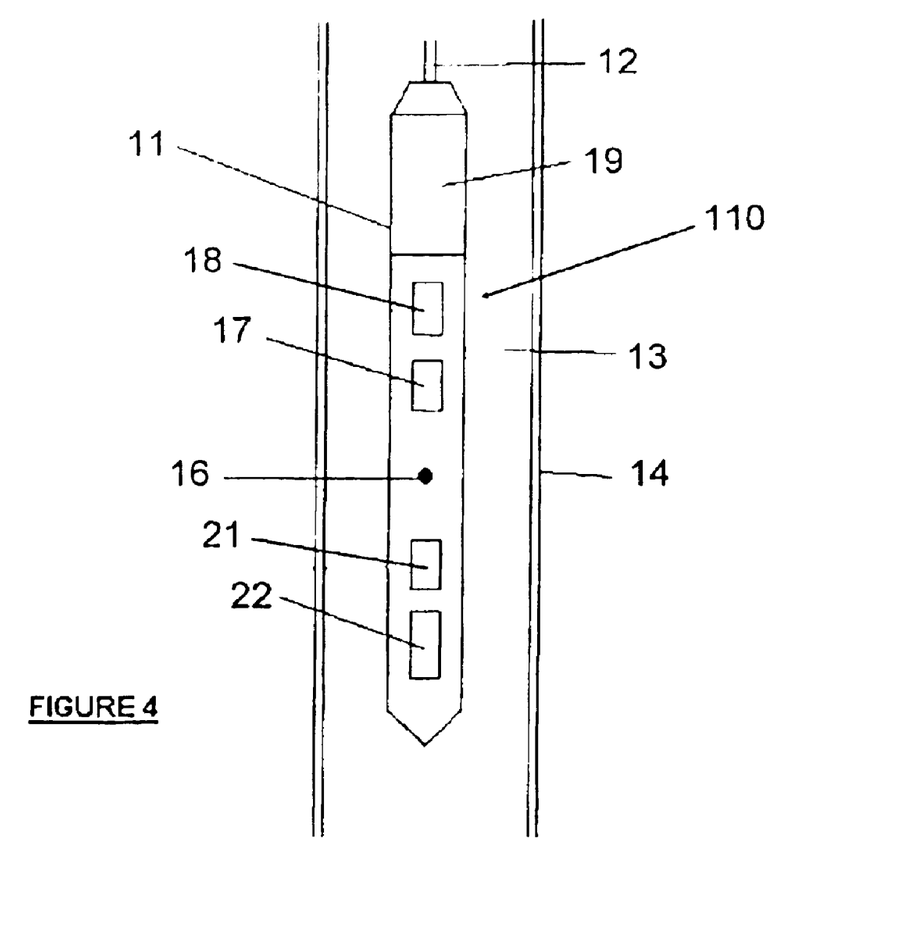
FIG. 4 is a schematic representation of a second embodiment of logging tool suitable for carrying out the invention.
Figure 5:
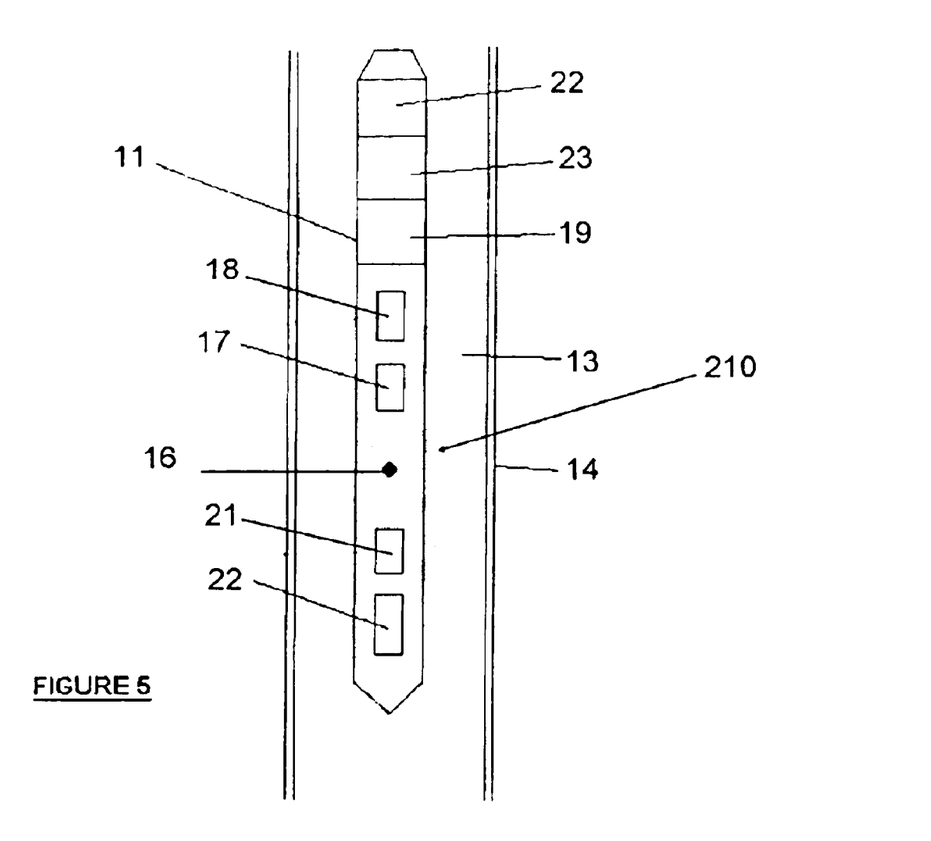
FIG. 5 is a schematic representation of yet a further logging tool according to the invention.

The characteristic plot of FIG. 1 may be stored eg. in the memory of a computer operatively connected to or integral with a logging tool 10, 110, 210, shown schematically in FIGS. 3 to 5.

FIG. 1 represents the count rates output by a pair of radiation detectors in such a logging tool for different combinations of borehole and formation fluids.

FIG. 1 is a specific example representative of oil/water contact in the formation and borehole. A similar plot would arise when considering gas/oil contacts. For simplicity, the following description will refer only to oil/water contacts although the methods and apparatuses of the invention are equally applicable to the detection and logging of gas/oil contacts.

Considering FIG. 1, when there is low salinity water in both the borehole and formation, the count rates are represented by point "A" which has count rates Fa and Na.

If only the formation fluid changes to oil, this point migrates to point "B" with count rates Fb and Nb.

If only the borehole fluid changes to oil, point "A" migrates to point "D" with count rates Fd and Nd.

If both borehole and formation fluid changes to oil, point "A" migrates to point "C" with count rates Fc and Nc.

Another way of describing this is to state that all points along line AD have the same formation fluid as do all points along line BC.

Similarly, all points along the line AB have the same borehole fluid as do all points along the line DC.

Figure 2:
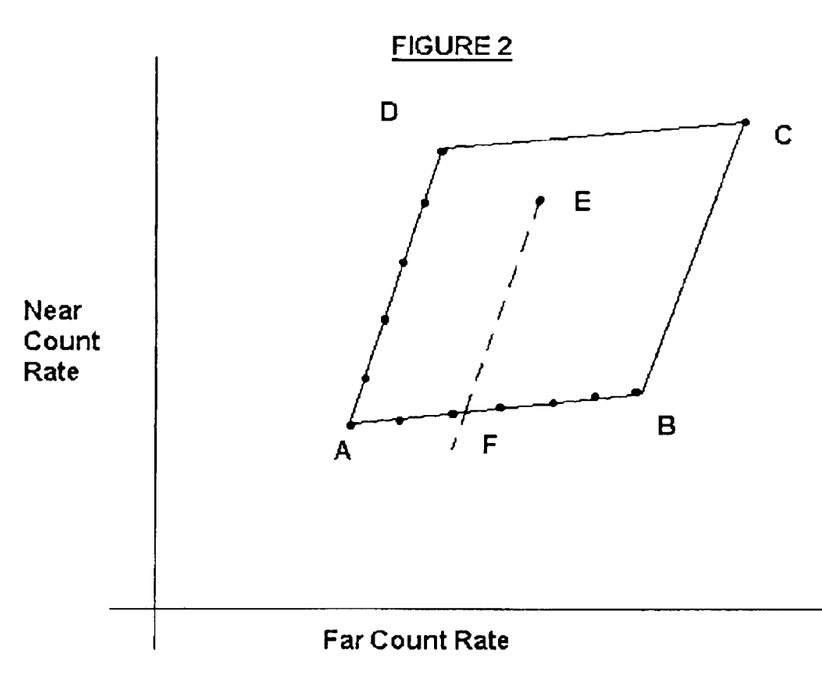
FIG. 2 is a characteristic plot, similar to FIG. 1, including a plotted count value representative of an actual formation fluid, and showing interpolation of the plotted count value to obtain data indicative of the characteristics of the formation fluid.

Referring now to FIG. 2, actual (ie. detected) count rates Fe and Ne are plotted at point "E" (FIG. 2) which is a point on a log that has unknown borehole and formation fluid. The method, according to the invention, of solving the unknown point involves determining the count rates that would have arisen if the borehole contained had a known fluid, and thence ascertaining characteristics of, and as a result identifying, the formation fluid. The method steps include migrating the plot point along line EF (FIG. 2), which is linearly interpolated between lines AD and BC, until it reaches a known borehole fluid point at point "F". From the count rates Ff and Nf at this point, one can calculate the formation fluid as a function of the distance that point "F" is along the line AB.

This two dimensional interpolation can be readily done by well known iterative techniques or by an analytical method described below:

The equations of lines AD and BC can be described as $$N = m_1.F + c_1 \quad (1)$$

And $$N = m_2.F + c_2 \quad (2)$$

Where $$m_1 = (Na - Nd)/(Fa - Fd) \quad (3)$$

$$c_1 = Na - m_1.Fa \quad (4)$$

$$m_2 = (Nb - Nc)/(Fb - Fc) \quad (5)$$

$$c_2 = Nb - m_2.Fb \quad (6)$$

The intersection of these two lines can then be calculated to be at point No and Fo
Where $$Fo = (c_2 - c_1)/(m_1 - m_2) \quad (7)$$

$$No = m_1.Fo + c_1 \quad (8)$$

The interpolated line EF also goes through this point of intersection and can be described as $$N = m_3.F + c_3 \quad (9)$$

Where $$m_3 = (Ne - No)/(Fe - Fo) \quad (10)$$

$$c_3 = Ne - m_3.Fe \quad (11)$$

The equation of line AB can also be calculated as $$N = m_4.F + c_4 \quad (12)$$

Where $$m_4 = (Na - Nb)/(Fa - Fb) \quad (13)$$

$$c_4 = Na - m_4.Fa \quad (14)$$

The point of intersection of lines EF and AB can now be calculated as Ff and Nf.
Where $$Ff = (c_4 - c_3)/(m_3 - m_4) \quad (15)$$

$$Nf = m_3.Ff + c_3 \quad (16)$$

The fraction of oil in the formation fluid can now be derived as $(Ff - Fa)/(Fb - Fa)$ It is not necessary for this fraction to be very accurate as at the water-oil contact the oil fraction changes from nearly 100% to nearly 0%

As noted herein one advantage of the method of the invention is that the tool used to log the cased borehole in accordance with the method steps defined herein may be the same as the tool used to log the borehole in the openhole condition, before casing.

This facility makes the method and apparatus of the invention highly suitable for "time lapse" logging in which the characteristics of the respective fluids in the borehole (more pertinently) the formation are logged at intervals of eg. six months.

The use of a common tool for the openhole and cased hole loggings may optionally obviate the need for a base log immediately after casing of the well. Such a base log has hitherto been necessary by virtue of the use of different tools for generating the openhole and cased hole logs.

The method of the invention can be executed by means of a computer which has collected data from a down-hole logging tool as described below.

One arrangement is shown in FIG. 3. Here the logging tool 10 comprises a pressure casing 11, suspendable on a logging cable 12 in a borehole 13 that has a steel casing 14. Within the logging tool there is a source 16 of neutrons eg. an isotope source capable of continuously generating fast neutrons, two neutron detectors 17, 18, and drive, control and communication electronics 19. The logging tool receives its power from surface apparatus via the logging cable 12 via which it also communicates. The components of the tool are functionally interconnected whereby eg. the electronics 19 receives power from cable 12 and count signals from the detectors 18, 19; and transmits data signals via the cable 12.

In the FIG. 3 embodiment the two neutron detectors 17, 18 sample the field of thermal neutrons within the borehole which are assumed to be in equilibrium with those in the formation.

The spacing of the detectors 17, 18 from one another and from the source are such that detector 17 measures the near count (derived from the borehole fluid) and detector 18 the far count derived from the formation fluid.

It is sometimes better to examine the gamma rays which occur as a result of thermal neutrons being captured in the formation as this may more directly represent the formation properties. To this end, the neutron detectors 17 and 18 may be replaced by gamma ray detectors.

Since the proposed method is designed to reduce the effects of the borehole on the determination of the formation fluid, it is advantageous to have both neutron and gamma ray detectors as shown in FIG. 4, where the additional gamma ray detectors 21, 22 are shown. In the FIG. 4 tool 110 all the other components are similar in form and function to the corresponding components of the FIG. 3 tool 10 and are similarly referenced herein.

Access to oil wells is often difficult and limited. The linear dimensions of the logging tool can become very important as the surface equipment at a producing well may not allow the use of long logging tools. A major advantage of the method of the invention is that it allows use of an isotopic neutron source which is typically only about 7.5 cm long. By comparison a pulsed neutron generator system as described earlier is often more than 2 meters long.

It is also often the case that it is not possible to deploy a logging system which makes use of a logging cable on a small site, again because of limited access. In this case the embodiment shown in FIG. 5 can be used where the logging tool 210 is self contained, being powered by a down-hole battery 22, and the data is stored in a down-hole digital memory 23 for downloading and analysis when the tool is recovered from the borehole. The FIG. 5 tool can be deployed on a simple cable that does not have an electrical conductor, or on the end of tubing or a drill-pipe during well maintenance operations.

In such cases the tool may of so-called "compact" diameter (i.e. less than 2¼ inches (57 mm) in diameter).

The method of the invention may not be effective when the density of the oil logged is greater than approximately 0.8 g/cm$^3$.

Although the migration technique of the invention is illustrated by the example of migration of the logged count rates E onto line AB of FIGS. 1 and 2, it is within the scope of the invention to migrate onto another of the constant gradient curves if desired. For example migration generally horizontally onto line AD is possible in order to assess the nature of the borehole fluid as opposed to the formation fluid. The technique for achieving such migration is similar to that described herein with reference to the migration to line AB.

Regardless of whether the method of the invention is used to log the formation fluid or the borehole fluid, it will be apparent that the method involves a technique of separating the effects arising from the formation fluid from those arising from the borehole fluid. This in turn allows the logging of characteristics of a contact in the formation fluid even when there is no a recognisable "contact" per se in the borehole fluid (ie. when the borehole fluid is an emulsion-like or amalgam-like mixture of oil and water).

What is claimed is:

1. A method, of logging a borehole, for use in a cased oil and gas wells for detecting the gas/oil or water/oil contact in a hydrocarbon reservoir, using a neutron capture technique to detect one or more properties of fluid by comparing the count rates from two or more neutron radiation detectors spaced at respective first and second distances from an isotopic source of continuous neutron radiation, the method including the steps of, at one or more locations along a said borehole, independently determining the properties of the borehole fluid and the formation fluid to define contact detection criteria and hence establish the location of the contact in a way that is unaffected by the borehole fluid and formation fluid chloride contents.

2. A method according to claim 1 wherein the detected fluid property includes the density of the fluid in the reservoir.

3. A method according to any one of claims 1–2 including the steps of: comparing the counts generated by the said detectors against a characteristic plot of count rates corresponding to known borehole and formation fluids, whereby to ascertain the characteristics of the formation fluid.

4. A method according to claim 3 wherein the characteristic plot includes a plurality of substantially constant gradient curves representing the relative proportions of water and oil or gas and oil in respectively the formation and borehole fluids; and the step of comparing the generated count rates against the plot includes the step of mapping a generated count point onto one of the constant gradient curves at a point on the characteristic plot that corresponds to a characteristic of the formation fluid.

5. A method according to claim 4 wherein the constant gradient curve onto which the generated counts are mapped represents the relative proportions of water and oil or gas and oil in the formation fluid.

6. A method according to claim 4 wherein the step of mapping the generated count rates includes migrating a plotted generated count value along a constant gradient interpolation line that is interpolated between and intersects the intersection of two divergent constant gradient curves of the characteristic plot.

7. A method according to claim 6 including an iterative technique for migrating the generated count along the interpolation line.

8. A method according to claim 6 including an analytical technique for migrating the generated count along the interpolation line.

9. A method according to claim 4 wherein the characteristic plot is a two dimensional plot of count rates generated by the respective detectors.

10. A method according to claim 9 including the step of generating a signal indicative of the relative proportions of water and oil or gas and oil in the formation fluid.

11. A method according to claim 10 when carried out using a borehole logging tool, and including the step of transmitting the said signal from the tool at a downhole location to a location remote from the logging tool.

12. A method according to claim 11 wherein the transmitting step includes
  (i) storing data representative of the signal in a data storage device operatively connected to or forming part of the well logging tool;
  (ii) retrieving the data storage device to a location remote from downhole; and
  (iii) downloading the data from the data storage device.

13. A method according to claim 11 wherein the transmitting step includes transmitting a signal in real time from a downhole location to a location remote from the logging tool.

14. A method according to claim 13 including transmission of the signal by one or more of:
  (i) electrical conduction via one or more wires; or
  (ii) generation of pressure pulses in borehole fluid.

15. A method according to any one of claims 1–2 implemented and/or co-ordinated by a digital computer.

16. A method according to any one of claims 1–2 wherein the logging is carried out using compact diameter battery memory tool.

17. A method according to any one of claims 1–2 wherein said logging is carried out using a logging tool that is used to generate an open hole log of the borehole and wherein said lopping is carried out after said open hole lop of the borehole is made and that data saved.

18. A method, of logging a borehole, for detecting a selected one of a gas/oil and water/oil contact in a cased well, said contact being the relative proportions of each first and second fluids detected in the formation fluid and the borehole fluid of the well, comprising the steps of:
  using a radiation source producing neutrons to irradiate the well from a tool lowered thereinto;
  detecting said radiation with at least two detectors on said tool with one detector being closer to said source and the other being farther from said source, said detectors providing a near count and far count, respectively;
  logging a first well having known contact conditions, to collect near and far count data over the range of percentage proportions for each fluid and generating a characteristic plot therefrom defining the range of contact values for each fluid in the foundation and borehole whereof said plot is a plot of near count rates vs. far count rates and renders a closed four-sided, four-corner plot;
  logging a well of unknown contact conditions to determine near and far count data; and
  interpolating said unknown contact conditions data with respect to said characteristic plot to determine the contact values of said formation and borehole fluids.

19. The method of claim 18, wherein said detecting step includes detecting neutrons with at least two neutron detectors, and wherein said interpolating step includes plotting said near and far counts and solving for the fraction of oil being derived as $(Ff-Fa)/(Fb-Fa)$.

20. The method of claim 18, wherein said detecting step includes detecting gamma rays with four gamma ray detectors on said tool with two being closer to said source and the other two being farther from said source, said detectors providing a near count and a far count, respectively, and wherein said interpolating step includes plotting said near and far counts and solving for the fraction of oil being derived as $(Ff-Fa)/(Fb-Fa)$.

* * * * *

UNITED STATES PATENT AND TRADEMARK OFFICE
CERTIFICATE OF CORRECTION

PATENT NO. : 6,747,270 B2
DATED : June 8, 2004
INVENTOR(S) : Charles Alexander Pereira and James Roger Samworth It is certified that error appears in the above-identified patent and that said Letters Patent is hereby corrected as shown below:

Column 1,
Line 30, change "U.S. Patent No. 28,477" to -- U.S. Patent No. RE28,477 --;

Column 6,
Line 37, formula should read -- $Fo=(c2-c1)/(m1-m2)$ --;

Column 10,
Line 2, replace "lopping" with -- logging -- and replace "lop" with -- log --.

Signed and Sealed this

Twenty-third Day of November, 2004

JON W. DUDAS
*Director of the United States Patent and Trademark Office*